United States Patent [19]

Mason et al.

[11] Patent Number: 5,835,735
[45] Date of Patent: Nov. 10, 1998

[54] METHOD FOR NEGOTIATING SOFTWARE COMPATIBILITY

[75] Inventors: Donald Mason, Garland; Christopher A. Criswell, Dallas, both of Tex.

[73] Assignee: Eastman Kodak Company, Rochester, N.Y.

[21] Appl. No.: 398,630

[22] Filed: Mar. 3, 1995

[51] Int. Cl.$^6$ .................................................. G06F 13/00
[52] U.S. Cl. ........................................... 395/287; 395/857
[58] Field of Search ........................... 395/821, 200.13, 395/287; 364/413.01, 401

[56] References Cited

U.S. PATENT DOCUMENTS

| | | | |
|---|---|---|---|
| 4,817,050 | 3/1989 | Komatsu et al. | 395/100 |
| 4,833,625 | 5/1989 | Fisher et al. | 364/518 |
| 5,117,351 | 5/1992 | Miller . | |
| 5,119,444 | 6/1992 | Nishihara | 364/413.01 |
| 5,289,577 | 2/1994 | Gonzales . | |
| 5,359,512 | 10/1994 | Nishihara | 364/413.01 |
| 5,384,900 | 1/1995 | Sato et al. | 395/100 |
| 5,452,287 | 9/1995 | DiCecco et al. | 370/17 |
| 5,469,353 | 11/1995 | Pinsky et al. | 364/413.01 |
| 5,485,507 | 1/1996 | Brown et al. | 379/88 |
| 5,499,297 | 3/1996 | Boekert | 380/23 |
| 5,513,101 | 4/1996 | Pinsky et al. | 364/401 |
| 5,542,003 | 7/1996 | Wofford | 382/132 |
| 5,548,727 | 8/1996 | Meehan | 395/200.13 |

OTHER PUBLICATIONS

"Digital Imaging and Communication in Medicine (DICOM)" Part I and Overview pp. 1, 3, 5, 7, 9, 11, 13, and 15 Mar. 27, 1992.

Primary Examiner—Ayaz R. Sheikh
Attorney, Agent, or Firm—William F. Noval

[57] ABSTRACT

The present invention provides a method for negotiation of compatible functionality between applications using network communications. The present invention provides a process which automatically negotiates between applications operating in a Picture Archival and Control System (PACS) so that each application sends and receives data and messages in accordance with each application's stated functional conformance claim. The functional attributes of each application are declared in a conformance claim. The conformance claim of each task is represented by an Unique Identifier (UID) which uniquely identifies the task within the network and also specifies the attributes of the task.

10 Claims, 1 Drawing Sheet

FIG. 1

METHOD FOR NEGOTIATING SOFTWARE COMPATIBILITY

BACKGROUND OF THE INVENTION

1. Field of the Invention

The present invention relates to the field of digital medical imagery and more particularly to negotiation of compatible functionality between applications using imagery and data network communications. The present invention provides a process which automatically negotiates between functional compatibility applications so that each application sends and receives data, imagery and messages in accordance with each application's stated functional conformance claim. The functional attributes of each application are declared in a conformance claim. The conformance claim of each application is represented by an Unique Identifier (UID) which uniquely identifies an application within a network and also specifies the functional attributes for the application.

2. Description of the Related Art

Modern hospitals and diagnostic clinics use medical imagery workstations to acquire, study, and store digitized medical imagery derived from a variety of imagery source devices or imagery "modalities." Typically, medical imagery source devices connect directly to user devices such as dedicated readers, printers, and storage devices. Imagery source devices are typically connected via a network. The network provides incoming imagery to diagnostic output devices such as workstations and laser film printers, or placed in optical storage devices.

The source devices provide imagery data in varying and diverse formats. Imagery data may be compressed, padded, packed, or contain overlay data. Application programs are written to control the flow of information and processing performed on these various source and user devices. Software programmers must determine what the capabilities of each application make sure that each communication takes place between functionally compatible applications. Typically the attributes of the source and destination tasks are hard coded into the software so that the addition of a new application or new capability require recoding of the internal software. Thus, there is a need for a process which automatically negotiates functional compatibility between applications. There is also a need for a process which enables a PACS to incorporate changes in source tasks and destination tasks and/or their attributes or capabilities and automatically updates the PACS without changing the internal software.

SUMMARY OF THE INVENTION

The present invention overcomes the limitations presented by typical PACS systems. The present invention provides a method which automatically negotiates functional compatibility between applications. The present invention also updates a PACS system configuration file to reflect negotiated functional compatibility between tasks and correlates functional characteristics for new applications. The present invention uses a Unique Identifier ("UID") to determine the functional characteristics of an application associated with a UID. The UID functional characteristics are mapped to functional characteristics within a local PACS.

DETAILED DESCRIPTION OF A PREFERRED EMBODIMENT

The present invention provides a method which negotiates compatible functionality between applications in a PACS environment. The present invention enables two applications, for example, a requesting and a responding application to determine those functionalities which are within the capabilities of both applications. The present invention provides a process which resides as an entity on top of an "Association Control" protocol layer. Association Control enables negotiation of compatible functional capabilities possessed by each application. Each application's capabilities are stated in terms of the DICOM standard and/or private message encodings and services an application can process, coding schemes each application can handle, and other such functional statements.

The Association Control Protocol enables a first application, A to tell a second application, B which DICOM and/or other private (non-DICOM) services which A can perform. B responds by telling A which of the requested DICOM or private other services B can actually perform. This enables applications to request and perform those services that A and B are mutually capable of performing. The negotiation process between A and B is handled automatically by the present invention.

Negotiation of such compatible functionality is based upon a set of unique identifiers ("UIDs"). UIDs are well known in the art (as described in the literature regarding the Open Systems Interconnect (OSI)). The present invention provides UIDs for two purposes. The first purpose is to codify all of or a portion of an application's conformance claim, a statement as to those functions which the application can perform or request to be performed by another application. Such a codified functional statement is referred to as a conformance claim. Conformance claims are statements by an application as to which of the DICOM or other services it is capable of performing or requesting. For example, an application might state in a conformance claim that it can store nuclear medicine images. The UID for this application, indicates that the application associated with the UID has the characteristic of or is capable of storing nuclear medicine images. This type of characteristic is referred to as a static characteristic. Persistent or static characteristics do not change until redefined during PACS reconfiguration. The present invention provides a unique identifier which identifies static or persistent aspects of an PACS application's conformance claim.

PACS also provides dynamic or temporary UIDs which are used to temporarily identify information objects which flow through a PACS system. Dynamic UIDs are used temporarily, for example, to identify an image which may be sent across a network in response to a request. UIDs are used in a PACS not only to identify static information, which persists across a product's operating environment and codifies a product's conformance claim information, but also represents temporary information such as images which are active within a PACS.

The present invention negotiates a common functional compatibility between two applications having distinct static UIDs. Each static UID represents an application's functionality statement or conformance claim. Static UIDs enable codification of a plurality of aspects regarding an application's conformance claim. In a preferred embodiment, UIDs are represented by a string of numeric characters or numbers which are interspersed with character delimiters or periods. Each UID character string is divided into arbitrary length segments, each N-characters-long. Each segment is delimited by a period. UID numbers do not represent any particular pattern of characteristics in general. The present invention provides a means for interpreting UID character string to determine the functional characteristics of an application associated with a particular UID, and to negotiate functional compatibility between applications represented by UIDs in a PACS environment.

Static or persistent UIDs represent conformance claims or the functional characteristics which an application can perform. Therefore, static UIDs change with the evolution of functionalities of the applications with which the UIDs are associated. Each time an application introduces a new functionality, the conformance claim and the UID for the application changes to reflect the new functionality which has been added to the application. The present invention provides a dynamic process for interpreting and negotiating between static UIDs which are capable of changing with the evolution of the "static" UID conformance claims. The present invention processes changing UIDs without any requirement for changing of the underlying PACS application software. Thus, the underlying complex PACS computer software application programs, which perform requested services do not have to be recoded when a new UID is introduced into a PACS.

The present invention derives functional characteristics from an application's static UID. There is no need for changing the underlying application software. It remains unchanged in the context of the rapid evolution of the static UIDs and the functional conformance information which the UIDs represent. While the DICOM standard ascribes some UIDs, it is common for users or vendors applications to create and assign their own non-DICOM standard UIDs, or "private" UIDs. The present invention provides a process which interprets and assigns functional characteristics to the non-DICOM standard UIDs or private UIDs which contain static functional conformance claim information. The present invention then negotiates functional compatibility between underlying application characteristics as represented by the UIDs.

For each type of static UID, the present invention provides a set of attributes which ascribe functional characteristics to a particular UID. In a preferred embodiment, a plurality of UID types are provided. Thus there are a plurality of characteristic types and characteristics which are ascribed to static UIDs. There is a set of attributes and functional characteristics for each unique UID type. The present invention provides a process whereby the UID attributes and functional characteristics are compared with the attributes functional characteristics of the application.

The negotiation process provide by the present invention adapts to new UIDs without the necessity of changing an associated underlying PACS application software program. For example, a particular vendor application may provide a set of DICOM standard UIDs and additional private UIDs, which the vendor has created outside of the DICOM standard. The vendor publishes a DICOM conformance claim along with definitions of its non-DICOM private UIDs which the vendor has assigned to its conformance claim information. The present invention provides a method for maintaining a vendor's definition of its private UIDs configuration files. Thus, upon start and configuration of a PACS, the vendor's new UIDs are configured into the PACS or may be update dynamically by messages and program control provided in a preferred embodiment. The present invention stores vendor private UID information for a PACS and assigns functional characteristics to newly created vendor private UIDs. The present invention assigns functional characteristics for new or previously unknown private UIDs in term of the characteristics of the local PACS. Thus the local PACS applications functionalities are napped to the functionalities requested by the incoming UID.

The present invention negotiates functional compatibility. For example, if a vendor created a private UID for a private Service Class Operation (SOP) which indicated that the vendor generates ultrasound images, the process of the present invention would associate "ultrasound images" with the vendor's private UID as a functional characteristic of that private UID. Thus, in a preferred embodiment of the present invention, a vendor's private UID is transmitted to and understood by the local PACS applications, without changing the application software in the local PACS. As the private UID and its associated functional characteristics information are received via message or operator entry into the local PACS system, the present invention creates a configuration file. When a local PACS is reconfigured using a new or updated configuration file, the vendor's private UID is defined and understood by the local PACS applications, via the new UID definition and associated functional characteristics as outlined in the configuration file. The present invention generates configuration files so that when configuring the PACS, the private UIDs are understandable in terms of the capabilities of the local PACS.

The present invention negotiates functional compatibility between capabilities in a local PACS application. Functional capabilities for applications are encoded using local PACS UIDs for the applications and their associated functional characteristics. The local PACS characteristics are represented by UIDs which comprise DICOM standard UIDs and private non DICOM standard UIDs. This is a considerable improvement over other PACS methodologies which require changes to the underlying PACS application programs to enable a PACS to recognize and understand a private or newly created UID. Prior systems would fail if they could not understand a new or private UID. In such systems, a new or private UID would not be recognized without recoding the underlying PACS application software to include the new UID.

The present invention provides more that a mere literal match between local UIDs and incoming UIDs. The present invention reads newly created or private UIDs, ascribes functional characteristics to the UID, and then examines the functional characteristics of the UID for compatibility with local PACS applications. The present invention compares the functional characteristics of the incoming private UID with the functional characteristics of the local PACS UIDs. The present invention negotiates functional compatibility between the incoming UID and the local PACS UIDs by determining whether or not the functional characteristics of the incoming UID are compatible with the functional characteristics of the local PACS UIDs. The present invention is thus an improvement over prior art systems which perform literal number comparisons to determine if UIDs are compatible and require hard-coding changes to PACS applications.

In a preferred embodiment, the present invention compares the characteristics of the incoming UID and local UIDs to determine whether the local UID is functionally compatible with the incoming UID. The present invention performs functional compatibility negotiations, notwithstanding that local PACS applications do not recognize or associate a particular incoming UID with a particular set of functional characteristics. The present invention provides a process for assigning functional characteristics to incoming UIDs and local UIDs. It then negotiates functional compatibility between incoming and local UIDs based on the characteristics of the UIDs. Rather than basing a match between the respective UID numerical values.

In a preferred embodiment, a plurality of UID types are provided by the present invention to represent static conformance claim information. UID types comprise, for example, transfer or abstract syntax, and SOP class. An SOP represents an atomic service element within a DICOM service. An atomic service element or SOP is the smallest unit of a DICOM service supported. A particular SOP class represents a particular type of SOP. In a particular instance of an SOP, an SOP class might indicate that an application is capable of storing a nuclear medicine image and that the application performs this task in a particular instance of a SOP class. In this case, the SOP class indicates that the application is capable of storing nuclear medicine images which are currently being transferred across the network associated with the PACS. An application UID indicates which of the DICOM standard services and other non-DICOM services that the application supports.

Figure 1:
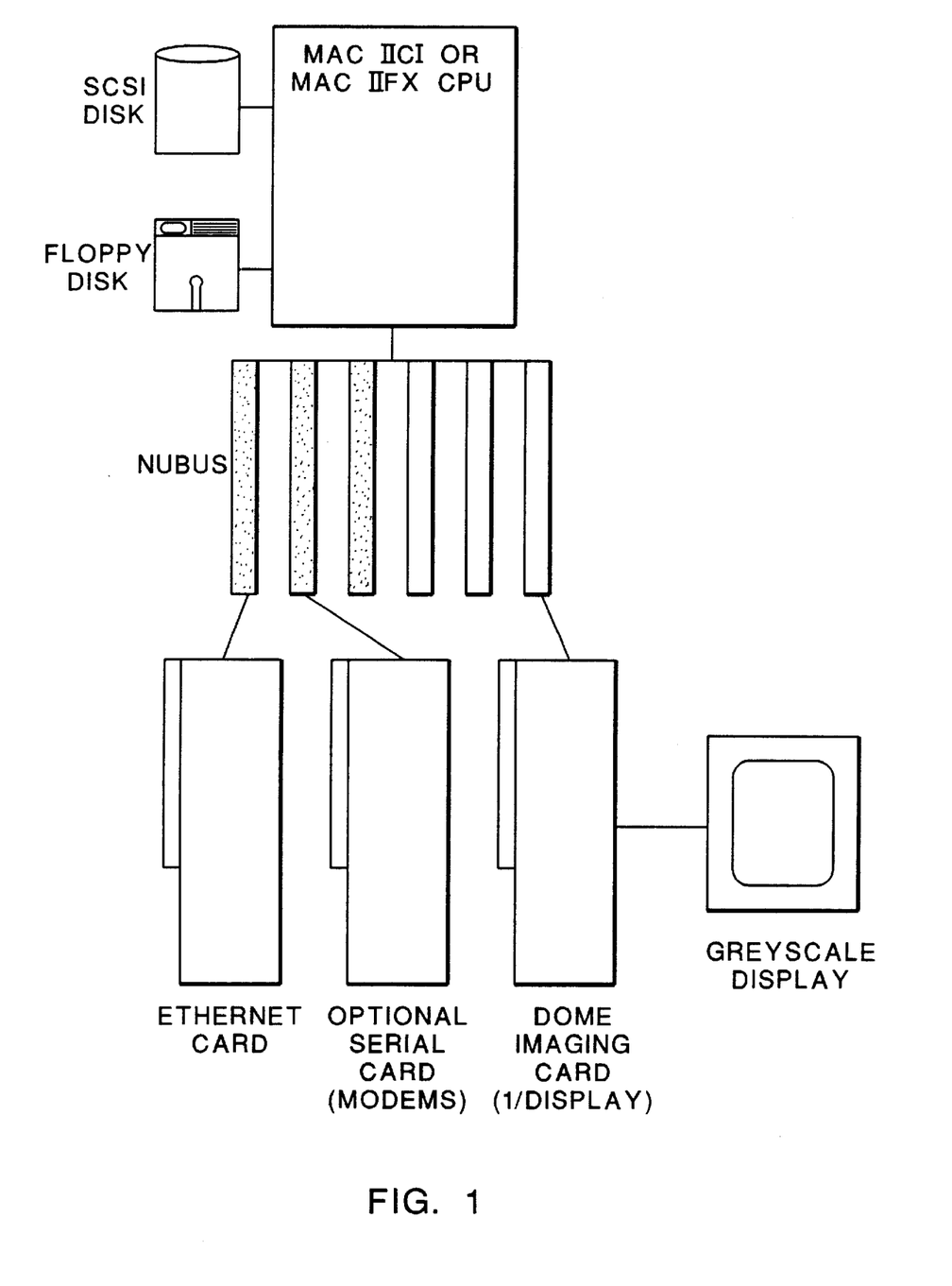
FIG. 1 shows a preferred embodiment of the present invention residing in a Picture Archival and Communication System hardware platform comprising computers, memory and a network interface.

FIG. 1 shows a preferred embodiment of the present invention residing in a Picture Archival and Communication System hardware platform comprising computers, memory and a network interface.

The present invention negotiates between UID conformance claims to enable an application to indirectly perform and request those services which are not part of the DICOM standard services UIDs. In a preferred embodiment, UIDs indicate services which are part of the DICOM services. UIDs also indicate those other services which may be special, new or private services and which are not part of DICOM standard services, but are offered by a particular vendor. The present invention provides a DICOM dictionary to associate the characteristics of a DICOM UID with characteristics of a local PACS. The DICOM standard service dictionary is provided to enable the present invention to correlate an incoming UID with a particular set of functional characteristics which are associated with the functional characteristics of a local PACS on which the present invention resides. The present invention provides a private dictionary to enable the present invention to correlate an incoming UID with those particular characteristics of a private non-standard-DICOM UID. Non-standard-DICOM UIDs are created by a vendor application to represent those vendor application services which are offered but are outside of the set of DICOM standard services.

In a preferred embodiment, an abstract syntax is provided which identifies a dictionary or interpretation file in which resides a set of correlative characteristics for a particular UID. The correlative characteristics enable the present invention to determine the functional characteristics associated with the incoming UID. An abstract syntax, for example, for a particular UID indicates either a DICOM standard dictionary/interpretation file or a private dictionary/interpretation file for a vendor application.

The present invention configures a local or remote PACS in order to update associations of functional characteristics with UIDs. The dictionaries are used to compare functional characteristics for negotiating between requesting and responding application conformance claims. Transfer syntax describes with the mode and format in which information is transferred over the PACS network. A single piece of information can be encoded and transferred using several different modes. For example, information may be byte-ordered, encrypted, compressed, or sent across the network in various different modes. Transfer syntax ascribes attributes of network encoding to information objects within a PACS.

In a preferred embodiment, the association control protocol negotiates functional compatibility between UIDs. For example, within association control protocol, a first application A ("A"), represented by a particular UID, UIDA sends a transfer request to a PACS. A second application, B ("B") represented by another UID, UIDB and existing locally within the PACS, responds to A. B accepts or denies A's request based upon the results of the negotiations between the UIDA and UIDB conformance claims. If B can perform the services requested by A, B will accept the request. If B cannot perform the services requested by A, B will reject A's request. If A can store ultrasound images (as indicated by A's UID, UIDA), A will send a request, comprising essentially one ASN per SOP with that ASN's transfer syntax, once per each encoding scheme. A sends a UID (UIDA) in the ASN to B. In a simplified example of the process of the present invention, UIDA might be, for example, 0000.1248.1000, correlating A with nuclear medicine image storage. Alternatively, UIDA might be, for example, 0000.1284.3000 correlating application A with ultrasound image storage.

The present invention also derives transfer protocol from a UID. Transfer protocol may dictate format, for example, the format of vendor X or of vendor Y. Vendor X and vendor Y may each require information in their own format, e.g., a particular byte order, regardless of the type of service being performed or requested. In this case, UIDA might be, for example, 0000.1284.1100, correlating application A with vendor X or Vendor Y transfer protocol, format and particular byte order. Thus the present invention enables use of the same numbers for a second ASN signifying that an application can perform either byte order for either service requested, that is, A can store nuclear and ultrasound images in both vendor X and vendor Y format.

When configuring a PACS, an ASN and its associated UID indicate the type of services provided by application A and application B. UIDs relate to service types, for example, STORE, QUERY, RETRIEVE and to administration services, for example: PATIENT MANAGEMENT, BUSY MANAGEMENT, STEADY MANAGEMENT, and RESULTS MANAGEMENT. The present invention creates a configuration file. Thus, when configuring an ASN within a PACS, configured characteristics are ascribed to a particular service type. In the present example, the configuration file will indicate that application A can perform reception of ultrasound images or nuclear medicine images. During configuration each service is distinguished so that functional characteristics are ascribed to each particular ASN. For example, a Store service might indicate what type of composite information object, that is, what type of image that particular task can receive and store. These image types comprise ultrasound imagery, nuclear medicine imagery, or computed radiography, etc. The configuration can be updated via a message to establish a new UID or the new UID can be placed in the configuration file for updating at system startup.

Thus application B's characteristics are such that B stores any type of image. Thus, the service type is STORE and the composite IO type is "*", which indicates B can store any type of image. During PACS configuration, the present invention examines each application or ASN UID and ascribes functional characteristics to the UIDs. Such assignments indicate the characteristics for the applications associated with each UID. A particular UID might indicate storage of nuclear medicine. Thus, the service type is STORE and the composite IO type is nuclear medicine. The present invention examines the functional characteristics of application B's UID and determines that B can store nuclear medicine images. Thus there is a match between the functionalities as requested by A and those functionalities of which B is capable of performing. The match process is positive. Thus compatible functionality has been negotiated between A and B. The present invention indicates that the two tasks can perform the service type and composite IO type requested. Thus B responds to A, "Yes, I can perform your requested service in the format in which you are requesting it."

A and B have no knowledge of each other's UID or associated functional characteristics. A and B need be concerned only with the underlying meaning or characteristics which are assigned to the UID. Thus as a UID or conformance claims represented by the UID change and so that an application creates a new UID, there is no need to recode either application A or B to recognize the new UID. Recoding is not necessary to incorporate a new UID or its associated correlative functional characteristics. Even if a UID is new or private, the present invention enables a PACS to add a new UID and its correlative functional characteristics to the PACS. Correlative functional UID characteristics are maintained in a particular dictionary or interpretation file, as indicated by the abstract syntax, discussed above. An update in such a dictionary or interpretation file enables the present invention to match functional characteristics which are correlated with UIDs in order to negotiate common functionalities between UIDs and the associated application. When UIDs or their characteristics change, no changes are needed to ASNs or local PACS application.

Continuing the example, assume that application A is correlated functionally with a STORE service, that is, A could be a product or application which supports a service class user of the STORE service. A could be a device such as a Personal Display System (PDS) or a Film Digitizer. A can be any modality which produces, manipulates, or stores images. PACS applications are image generators or image users. UIDs indicate what functional characteristics are associated with an application. The present invention provides configuration information which enables these applications to ignore functional characteristics once the present invention has negotiated compatible functionality between applications. The present invention provides a mechanism for determining UID and associated characteristics without direct access to UID characteristic information, thus eliminating the need for hard coding of local applications in order to incorporate changes to UID characteristics within a PACS. An application A generally accesses nothing more than a textual description of another application, e.g., B. The UID associated with B indicates the details of the performance of services provided by B.

UID configuration information also includes a host and port number for transmitting imagery and information over a network to application B. Resource management limits and parameters are taken into consideration so that the overall resource limits of the PACS are not exceeded. There are a plurality of different categories of configurable entities represented in this UID configuration information.

In a preferred embodiment, the present invention provides two ways of disseminating UID functional and correlative characteristic information. In a first embodiment, a configuration text file is broadcast over a PACS network and imported into a local PACS to enable applications within and without the PACS to understand and indirectly access externally configurable information. A configuration text file comprises UIDs and correlative functional characteristics, as well as a description of the functional and correlative characteristics or attributes. In an alternative embodiment UID support mechanisms are provided which communicate UIDs and correlative functional information over a PACS network to disseminate configuration and functional correlative information centrally across a PACS network.

In a preferred embodiment of the present invention, configuration information is maintained within a tactical customer support facility or resides locally or alternatively the configuration is disseminated through SNMP protocol, which is well known in the art. Configuration information is located on the network and accessible to the present invention to enable the present invention to negotiate compatible functionality between two applications. A configuration file is provided in which UID functionality is communicated over the PACS network. The configuration file may be created by a computer programmer or created automatically by the present invention via updates to configuration files which contain additional UIDs created by specific vendors.

Configuration files are generated and updated as each new product is created. Thus service classes are defined and conformance claims stated within the configuration file. The present invention negotiates between conformance claims utilizing configuration files assign attributes and functional characteristics of UIDs which represent the conformance claims of, for example, vendor application A and vendor application B. The present invention examines the two conformance claims represented by the UIDs and determines whether or not the requested services and communications between vendor application A and vendor application B are possible. For example, if A cannot store and B can store, A cannot handle a store request. A requests that B handle the store request. Thus, the conformance claims indicate what types of services applications are capable of performing. This enables selection of applications which are compatible with a request issued in the context of a UID conformance claim. Moreover, this enables vendors to predetermine whether or not they are functionally compatible from a standpoint of services requested and services performed. The present invention enables a PACS to configure conformance claims by replacing the configuration file or updating the configuration file during operation.

The present invention facilitates integration of new functionalities. Vendors continuously change and update applications and create new UIDs. New functionalities are added by simply updating a configuration file or a vendor dictionary/interpretation file. Updates represent functionalities added to a vendor's conformance claim. A change in a conformance claim requires a change in a UID which represents the conformance claim. The present invention enables negotiation of conformance claims between vendors without requiring commonality between of the mapping of UIDs to particular characteristics. The present invention enables negotiation of conformance claims in a rapidly changing environment in which functional characteristics of various vendor PACS applications change rapidly. Vendors create new services and new private UIDs to represent these services. The present invention enables a PACS environment to take advantage of the evolution of services provided by vendors without requiring any changes in the underlying PACS applications which provide the services.

DICOM STANDARD

The DICOM standard provides a means to formally express networking services relevant to communicating medical imagery and information. Medical information comprises images, print pages, patient demographics, hospital or radiology clinic visits, scheduled studies and diagnostic results. Images are copied remotely (using a STORE service) or queried-for (using a QUERY/RETRIEVE service). Print pages are created, manipulated or printed to a remote printer (using a PRINT MANAGEMENT service). PATIENT, VISIT, STUDY and RESULTS information are received from modalities, for example, the Kodak Health Imaging Systems HIS/RIS using the HIS/RIS group of services.

The DICOM standard and the API toolkit provide a piece-wise solution to providing services in a PACS. Similar to the Operating Systems Interconnect (OSI) model, network services are achieved through the use of a set of independent protocol layers. The lowest-level protocol is the "Association Control" protocol. "Association Control" protocol is used to obtain a set of basic networking capabilities agreed-to by two applications. This protocol resides on top of a network transport protocol (e.g. TCP/IP).

The next protocol level utilized by the present invention is the element encoding protocol (described in Part 5 of the DICOM standard). Element encoding roughly corresponds to a presentation layer as used in OSI. This layer specifies the DICOM attribute types and how these attribute types are encoded. The next protocol layer is referred to as DIMSE. This protocol specifies how DICOM services are achieved through the use of DICOM messages (e.g. C-STORE, C-ECHO, N-SET, etc.). A collection of DIMSE messages which are used to achieve a particular DICOM service are referred to as a "service group".

The DICOM standard does not impose formal requirements on services, but only describes protocol. The DICOM standard expresses each service as a MAPPING from human-understandable design abstraction to a portion of a protocol. In a preferred embodiment of the present invention, an API tool kit enables an application programmer to develop DICOM standard service applications. The API toolkit comprises application subsystems and internal subsystems. Application subsystems are used directly by application entities. Internal services are used indirectly by applications to conform to PACS protocols, as described above. An application does not deal with services directly. Application subsystems provide a realization or framework of an abstracted form of DICOM and non-DICOM services provided by the application. The indirect application interface to DICOM and non-DICOM services help facilitate use of the API tool kit (i.e. getting DICOM connectivity).

The DICOM standard can be extended, for example, by adding annexes to Part 3, 4 and 7. Totally new services may be added as well. While the DICOM tool kit is designed to easily deal with anticipated future extensions of the standard, local PACS applications are written against a particular release of the DICOM standard. From time to time, new versions of the DICOM standard are released.

The API tool kit comprises eight software subsystems and two groupings of software programs. The subsystems comprise the information object database subsystem, the information object subsystem, the file subsystem, the message exchange subsystem, the presentation subsystem, the pixel/overlay data processing subsystem, the association control subsystem, and the machine/transport independent transport subsystem. The two groupings of programs are 'DICOM utilities' and 'DICOM test tools'.

In a preferred embodiment, the API tool kit supports creation of application programs for several of the SOPs defined in the DICOM standard for the following general kinds of services: VERIFICATION, STORE, QUERY/RETRIEVE, STUDY CONTENT NOTIFICATION, (basic) PRINT MANAGEMENT, (advanced) PRINT MANAGEMENT, and (HIS-RIS services) PATIENT, VISIT, STUDY, RESULTS MANAGEMENT.

The following is a description of the specific kinds of major services that the API tool kit supports: General association initialization and shutdown. This area is addressed in DICOM Part 8. Buffer movement into/out of an open association. This area is addressed in DICOM Part 8. Element construction via stream parsing or application creation. The types of elements having this behavior are addressed in DICOM Part 5. Message segment 'editing' via element addition or removal. The types of elements having this behavior again are addressed in DICOM Part 5. Command and response construction. This area is addressed in DICOM Part 7. Command and response sending/receiving. This area is addressed in DICOM Part 7. Information Object construction, validation, sending/receiving (composite IO), remote attribute setting/getting (normalized IO) and remote action (normalized IO). Composite IOs are addressed in DICOM Part 3. Normalized IOs are addressed in DICOM Parts 3 and Part 4. Composite IO, Normalized service-class object pair (SOP) and Command/Status definition construction and use during validation. This also includes lower-level (element) syntax validation using a data dictionary. Composite IO semantics is addressed in DICOM Part 3. Normalized SOP semantics is addressed in DICOM Part 7. Non group-O element syntax is addressed in DICOM Part 5 and 6. Wide-area network support for transport of association control protocol. This includes: Switched-56 service, TCP-IP TI, and TCP-IP PPP. Information Model specification and use in validation of queries. Information Models are specified in DICOM part 4: Annex C. File services capable of storing/retrieving Information Objects in DICOM Part 10 or Imagelink file format.

An Information object database supports two categories of services, application services and network services. Application services comprise database object definition, database navigation and database object manipulation. Application database services are outside of the DICOM standard. Network database services comprise query/retrieve and query-by-UID services. Query/Retrieve service is addressed in DICOM part 4: Annex C. A filtering framework is provided for pixel and overlay data manipulations. The Personal Display Station, PDS is provided as a general purpose framework for performing processing of pixel data.

Information Object Database Subsystem

The API tool kit supports the notion of a DICOM Database. This feature is outside the scope of the DICOM standard but permits applications to manipulate DICOM information and easily support query/retrieve and query-by-UID services. This database is consistent with information model (IM) notions in the DICOM standard in the following ways: Underlying information stored is as DICOM attributes. IMS support encompasses those defined in DICOM Part 4 Annex C for composite IOs and those defined for normalized IOs in part 10 Annex B. Within a particular information model, all database entities are represented in a hierarchy.

This database deviates conceptually from IM notions in the standard in the following ways: The concept of a "user folder" is supported. Briefly, user folders are the means by which custom organizations of database information are provided. Specifically, folders enable creation of heterogeneous hierarchies of information. User folders hold entries that reference any kind of database entity. User folders are a superset of the DICOM Part 10 annex B "topic" concept's capabilities.

A database designer can create hierarchies beyond the ones prescribed in DICOM Part 4 Annex C. The IMs outlined in DICOM Part 10 Annex B are not always directly achieved via the database implementation model. In this database (refer to DICOM Part 10 Figure "Media Storage Directory Information Model") the print Queue submodel is directly representable in the implementation model. The Topic submodel is represented through user folders; the patient submodel is represented through a combined use of several different implementation models and user folders. The databases permit querying and navigation through the database, and insertion, deletion and modification of database information. This database is thus intended to bring a consistent means for maintaining persistent DICOM information.

Internal Subsystems

A File Subsystem is provided for manipulating DICOM files. The File Subsystem is in some ways an extension to and in others a limitation of the file system described in the DICOM Standard. The File Subsystem maintains individual DICOM Part 10 files within this subsystem, however, it does not use DICOMDIR as the directory mechanism. Instead it generates an abstracted File System based on a common-denominator of the supported platforms. DICOM Part 10, "M-Services"; M-WRITE, "M-M-READ, M-DELETE, M-INQUIRE, M-INQUIRE FILE-SET and M-INQUIRE FILE are supported in an equivalent form.

The directory concept is a platform abstraction, for example Sys 7 & Unix, not to be confused with the DICOMDIR. It is for purposes of organizing information. The File Subsystem can contain sub-directories or (DICOM) files. The concept of a "root" directory is supported. The File Subsystem also supports remote and removable Directories via "mount/unmount" commands. The mapping of the DICOM concept of file-set to the File Subsystem directory abstraction is as follows: Any directory and its contents including subdirectory contents, may be designated as a file-set. Within that directory, a DICOMDIR file exists.

The concept of a wildcard C-Move is supported (i.e. wildcard identifiers). Wildcards are not permitted in standard C-Moves. Applications can restrict the tool kit to only send/receive standard requests (i.e. non-wildcarded requests). Wildcarding is assumed to behave match-wise in the same manner as for "full hierarchy" matching in a C-Find. "GET SOPs" are supported in the tool kit. Corresponding equivalent MOVE SOPs are also supported.

The concept of a "C-Delete" command/status is supported as an extension to the DICOM standard. The semantics for the C-Delete commands are similar to the semantics for a C-Move (i.e. identifiers can have wildcards but an application can restrict C-Delete to non-wildcards only) except that a match results in an application deleting the corresponding matching image (instead of storing it).

Presentation Subsystem

The presentation subsystem handles encoding and decoding of formatted images, for example, Imagelink ACR-NEMA 2.0 images. When an Imagelink 2.0 SEND (DICOM C-STORE) message is encountered by the API tool kit, a default META-SOP which means "SEND" is assumed.

The File Subsystem provides a means to create and use default values (even though the capability was retired in the DICOM standard). This provides another means by which applications can function effectively without knowledge of information within AN messages. The File Subsystem does not finally determine whether or not a condition for a module's requirement type has been met. For example, for a module say like the 'contrast-bolas' module is included only if the patient for that image was injected with a contrast agent. This type of criteria is outside of the protocols defined by the DICOM standard. When certain elements appear in a message and the File Subsystem maps them back to a particular module (one element can appear in multiple modules within a given information object type of SOP class but should have the same semantics as the information object type of SOP class). This would (for conditional modules) imply that the module's condition has at least trivially been met.

For generic validation purposes, this subsystem interprets the DICOM Part 4 service specification's status category "refused" as "failed". Element requirement type of elements in the status category "modules" in the DICOM Part 7 are assumed to be type 1 if the element appears in the corresponding SOPs status table in the DICOM Part 4 service specification (otherwise it's assumed to be type 3).

The File Subsystem supports repeated group information. A repeating group is a range of groups whose elements (with matching element numbers) have the same syntax and semantics. Also supported is the concept of equal-sized ranges of elements within a single group where the Nth element within any two ranges have the same syntax and semantics referred to as a "repeating range of elements".

Association Control Subsystem

The "Association Control" provides a means to assign attributes to static UIDs (e.g. transfer syntax, abstract syntax, etc.). One of the attributes is 'vendor type'. This facilitates mapping a third party vendor's UIDs to/from local PACs e.g., KHIS UIDs. This enables configuration of a local PACs, e.g. a KHIS product application in local PACs, in terms of a KHIS UID context.

Association Control provides a process to configure a multiple transfer syntax in a MULTIPLE presentation context for the same abstract syntax. This enables an application to select from among the multiple Transfer Syntax (TS) choices presented for transferring, e.g. images in different formats in the same association (e.g. compress high-resolution MR images and leave uncompressed low-resolution MR images).

Information Object Subsystem Features

The Information Object Subsystem (IOS) facilitates implementation of services defined in DICOM Part 4 these services provide for both composite and normalized information objects as well as query/query-result datasets. This subsystem supports manipulating Information Objects (or query/query-result datasets) themselves. The services that apply to a particular IO are directly available. For example, there is a direct means to STORE a MR information object, MR. IO. IOS supports all non-generic SOP-class specific application-validation. IOS supports a direct means to access commonly used IO attributes.

IOS supports the concept of a UID<−>Dataset mapping. There is a relationship maintained between active IOs and the UIDs that reference them. The following tables are a list of the SOPs supported in the present example of a preferred embodiment:

TABLE 1

Supported STORE SOPs

| SERVICE TYPE | COMMAND TYPE | ENTITY TYPE | NOTES |
|---|---|---|---|
| STORE | C-Store | bsd IO | |
| | | ct IO | |
| | | mr IO | |
| | | nm IO | |
| | | ps IO | |
| | | sc IO | |
| | | us IO | |

TABLE 2

Supported QUERY/RETRIEVE SOPs

| SERVICE TYPE | COMMAND TYPE | ENTITY TYPE | NOTES |
|---|---|---|---|
| QUERY/RETR | C-Find | patient-root IM | Only one hierarchical IM type per toolkit instance |
| | | study-root IM | same |
| | | patient/study-only IM | same |
| | | print-session-root IM | same |
| | | print-session-only IM | same |
| | | full relational | |
| | C-Move | patient-root IM | Only one hierarchical IM type per toolkit instance |
| | | study-root IM | same |
| | | patient/study-only IM | same |
| | | print-session-root IM | same |
| | | print-session-only IM | same |
| | | full relational | |
| | C-Delete | patient-root IM | OnLy one hierarchical IM type per toolkit instance |
| | | study-root IM | same |
| | | patient/study-only IM | same |
| | | print-session-root IM | same |
| | | print-session-only IM | same |
| | | full relational | |

TABLE 3

Supported basic PRINT MANAGEMENT SOPs

| SERVICE TYPE | COMMAND TYPE | ENTITY TYPE | NOTES |
|---|---|---|---|
| basic PRINT MANAGEMENT | N-Create, N-Set, N-Delete, N-Action | basic Film Session SOP | |
| | N-Create, N-Set, N-Delete, N-Action | basic Film Box SOP | |
| | N-Set | basic Greyscale Image Box SOP | |
| | N-Set | basic Color Image Box SOP | |
| | N-Set | referenced Image Box SOP | |
| | N-Event, N-Get | Printer SOP | |
| | N-Event, N-Get | Print Job SOP | |
| | N-Set | basic Annotation Box SOP | |
| | N-Create, N-Set, N-Delete | VOI LUT Box SOP | |
| | N-Create, N-Set, N-Delete | Image Overlay Box SOP | |
| | — | basic GrayScale MetaSOP | |
| | — | basic Color MetaSOP | |
| | — | referenced GrayScale metaSOP | |
| | | referenced Color MetaSOP | |

TABLE 4

Supported other SOPs

| SERVICE TYPE | COMMAND TYPE | ENTITY TYPE | NOTES |
| --- | --- | --- | --- |
| STUDY-CONTENT NOTIFICATION | C-Store | | |
| VERIFICATION | C-Echo | | |
| PATIENT-MANAGEMENT | N-Get, N-Event | Detached Patient management SOP Class | release 2.0 |
| VISIT-MANAGEMENT | N-Get, N-Set, N-Event | Detached Visit Management SOP | release 2.0 |
| STUDY-MANAGEMENT | N-Get, N-Set, N-Event | Detached Study management SOP | release 2.0 |
| | N-Create, N-Get, N-Set | Study Component Management SOP | release 2.0 |
| RESULTS-MANAGEMENT | N-Get, N-Event | Detached Results Management SOP | release 2.0 |
| | N-Event, N-Get, N-Set | Detached Interpretation Management SOP | release 2.0 |

Composite Information Objects

The STORE service for both SCUs and SCPs is supported. The following types of composite IOs are supported: basic study descriptor (bsd), computed radiography (cr), computed tomography (ct), magnetic resonance (mr), nuclear medicine (nm), print session (ps), secondary capture (sc), and ultra-sound (us).

Normalized Information Objects

PRINT MANAGEMENT services is supported for both SCUs and SCPs. The following types of normalized IOs are supported: basic film session, basic film box, basic image box, basic annotation, image overlay box, printer, print job, and voi lut. The following types of normalized IOs are provided: patient, visit, study, study component, result, and interpretation.

Query/Query-Result Datasets

QUERY/RETRIEVE service for both SCUs and SCPs is supported. The following types of information models are supported: patient root, study root, print/study-only, print session-root, and print session. The present invention enables definition of hierarchies outside the DICOM standard hierarchies.

The notion of a DICOM database is outside the scope of the DICOM standard but is intended to permit applications to easily support general application database navigation, insert, delete and modify services and network database insert/query services. This database may represent a hierarchical organization of images, a pseudo HIS, pseudo RIS, or print queue, etc. This subsystem implements such a database. The database is based upon the DICOM standard attribute hierarchical model introduced in DICOM part 4 (with generalizations in DICOM Part 10). Thus the database has database level objects. Each object contains attributes unique to the corresponding level. Lower-level child objects are contained in a single parent higher-level object through a implementation-specific collection mechanism. The hierarchy mechanism is further extended through support for manipulating user-folders. While the model is general, a particular instance of the model is based on an implementation hierarchy.

When products or interfaces are created or modified, the database-designer uses the database object definition facilities provided through the API DICOM Toolkit tools. The designer may identify which DICOM attributes they wish to store within the database and what kind of database hierarchy with which to implement the database. Semantics of the database hierarchy through IM validation are implemented as described above. The database creation occurs during a software compilation phase. Actual inclusion of the database within the product is achieved during a software linking phase.

Once established, a database instance can service two kinds of user's, application users and network users. Application users may, for example, navigate through a database to provide a view of the database, to a user to enable changing database objects, inserting new ones or deleting current ones. The network user is restricted to one of the DICOM QUERY/RETRIEVE SOPs.

The DICOM database may coexist with other application databases. The database supports user-specified database implementations based on a user-defined hierarchical information model (HIM) composed of DICOM attributes. Each database instance is implemented with one type of HIM. The user specifies the semantics of the HIM within an IM Validation. The database supports servicing QUERY/RETRIEVE SOP requests corresponding to a database's implementation HIM (IHIM) or a full relational model (both as prescribed in DICOM Part 4, Annex C). A description of the language used to express a database definition is discussed below in the "Database Definition Language" section.

The database supports application or product specific database structure. It supports changing database structures or indices easily. It supports user-folders. The user may specify a user-folder support in any level of the database IHIM. The user may also specify what types of elements can be contained in a folder (which can include a reference to any kind of database object including another user-folder). User-folders are provided to supporting application database users and are currently outside of the standard DICOM services. The database supports importing or exporting a database to/from a file system.

The database supports database level navigation. The user iterates through any database implementation level, enters a lower level or returns back to a upper level. The database supports application-specific DICOM compatible attributes. This means that as long as an attribute has the syntax of one of the above mentioned types and is implemented as such, it is supported by the database. The database coexists with a non-DICOM user-information database. DICOM-like entities are encapsulated in the DICOM-specific portion of the database.

The Network database stores user-specified types of composite and normalized Information Objects. It stores a small number of such objects (i.e. this is not intended as a replacement for an 'archive'). It supports SCP-handling of all FIND, MOVE and DELETE standardized SOPs. It also supports queries by identifier corresponding to any standardized DICOM hierarchical data model. This is achieved through the setting of the database network access model to a full-relational one, honoring queries that precisely match the database implementation hierarchy. The Network database supports DICOM "match count" matching of C-Find results. Support for this may be disabled by an application. The Network database also supports maintenance of an account of completed successful or completed unsuccessful or remainder image transfer counts when processing an incoming C-Move request. It supports incoming full-relational queries by an application, query-by-UID, and asynchronous delivery of query results.

Pixel Data/Overlay Processing Subsystem Features

In a preferred embodiment, Imagelink display devices impose restrictions on the form of pixel data and overlays. In the case of the Personal Display System (PDS) this ensures an efficient match with the preferred embodiment, DOME display hardware. The PDS prefers that PDS data be uncompressed, unpacked, padded (rows should be a multiple of 4 and columns should be a multiple of 4), and contain external overlays. To facilitate accomplishing the above needs, this subsystem supports the processing of pixel data and overlay data, as follows:

Byte Order (supported at 'lowest presentation level'): (Supports little to/from big endian conversion). A non-standard implicit big-endian byte order is also supported.

Pixel Data Packing/Unpacking: Supports both 8 bits<–>8 bits and 8 bits<–>16 bits.

Pixel Data Padding/Unpadding: Supports 'multiple of 4' padding in both the row and column dimensions.

Internal/External Overlay Conversion: Supports conversion between internal<–>external overlays. Internal overlay information is contained in unused pixel data bits while external is contained in the overlay group itself. All overlays within an image are assumed represented in the same format (i.e. all internal or all external).

Compression/Expansion: A preferred embodiment supports KHIS priority lossless expansion. JPEG extended baseline Huffman-encoded lossy compression/expansion, and JPEG Huffman-encoded lossless compression/expansion.

Non-square pixels: Supports a conversion to non-square pixel data via algorithm.

Multi-planar/Interleave pixel data conversion:

Multi-frame pixel/overlay data separating/combining:

File Subsystem Feature

The machine/OS independent file services subsystem unifies the diverse user interfaces presented by Mac System 7, Sun Solaris 2.3+ and Motorola 1×7 System V (R4) units into one event-driven synchronous+asynchronous API encapsulated by a single unified API. The preferred API provides: optional asynchronous interfaces for all services. This provides a performance boost for certain Macintosh applications; mount services: mount and unmount; directory services. Creating, renaming, deleting and iterating through entries; directory+file services. Creating, renaming and deleting Part 10 (including DICOMDIR) files; and open file services. Opening, closing, reading data and writing data.

Message Exchange Subsystem Features

The Message Exchange Subsystem implements the services described in DICOM Part 7 (Message Exchange Services). This encompasses for each (service primitive) command type, the ability to create a command or corresponding status. The Message Exchange Subsystem supports the creation and deletion of any command or status described in DICOM Part 7 of the standard. This subsystem also supports coordinating sending, receiving, encoding and decoding of these entities as well. This subsystem supports the ability to simultaneously send and receive DICOM messages.

Message Management

Message Management comprises several subcomponents which facilitate in message management. One subcomponent provides a means to define and use DICOM transactions and relate them to open associations. This subsystem helps to map statuses to corresponding commands and C-Sends to corresponding C-Moves. This subsystem also helps to insure that all outstanding transactions are terminated upon the shutdown of a corresponding association. Another subcomponent throttles the number of outstanding transactions which may be sent or received on an open association. This uses a previously negotiated asynchronous window described in DICOM Part 7.

Another subcomponent supports verifying if a message delivery based on previous negotiated SCP-SCU roles (also described in DICOM Part 7). To help accomplish this, this area also determines SCP-SCU roles for a network-incoming messages. Finally, another subcomponent supports the ability to transmit messages at a particular priority. It also supports the ability for handling setup priority queues for dealing with incoming messages.

SOP-Specific Extended Negotiations

In a preferred embodiment, SOP Extended negotiations provide negotiation of the following kinds of SOP-specific negotiables (listed by DICOM service): At an association level, negotiation of SCP-SCU roles and the asynchronous throttle window are both supported; STORE: Level of support, Element coercion; QUERY/RETRIEVE: Relational queries; and HIS/RIS services. These subsystems are also oriented toward even-driven delivery of asynchronous information.

Presentation Subsystem Features

The presentation subsystem comprises two areas, message segment encode/decode and generic validation. Generic validation encompasses all of the element syntax formats described in DICOM Part 5 and assigned in DICOM Part 6. Generic validation also encompasses generic semantics described in the IOD contained in DICOM Parts 3, 4 and 7.

Message Segment Encode/Decode Features

Message Segment Encode/Decode supports generic element (includes Sequence of Items). It also supports specific element encoding/decoding for the following types:

| | |
|---|---|
| • Application Entity | Age String |
| • Attribute Tag | Code String |
| • Date | Decimal String |
| • Floating Point Single | Floating Point Double |
| • Integer String | Long String |
| • Long Text | |
| • Other Byte (uncmpr'ed+JPEG cmpr'ed) Other Word | |
| • Person Name | Sequence Of Items |
| • Short String | Signed Long |
| • Signed Short | Short Text |
| • Time | UID |
| • Unsigned Long | Unsigned Short |

This includes support for the following interfaces: Create, Destroy, Encode (to a DICOM stream or a text stream), Decode (to a DICOM stream or a text stream), Insert (element), Remove (element), Find (element), Compare two element data values, and Match against (explicit or wildcard) element (identifier) data values. This area supports the ability of an SCP of C-STORE to meet DICOM Level 2 conformance. In other words, this layer supports maintaining storage of all type 1, 2 and 3 data set elements within incoming (association or file stream) C-STORE messages.

This subsystem also supports private elements (known in ACR-NEMA 2.0 as "shadow group" elements). It handles any order of manufacturer name in a private group slot space. Duplicate manufacturer names are supported as well. This area also supports multi-valued elements. This subsystem is not sensitive to the underlying entity reading or writing the streamed data it presents. This solves the association control and media exchange encoding issues in one area. At "end of message" boundaries, this subsystem supports the ability to callback with a partially decoded message under the following circumstances: a particular group of elements has just been decoded, a particular element tag is about to be decoded, and a certain percentage of data within an element has been handled.

The above feature facilities processing command information and reporting periodic status. This subsystem supports the ability of the user to perform certain conversions in element data representation. This includes the following types of conversions: ASCII numeric string-discrete number-float, and string padding/unpadding. This subsystem also supports the encoding/decoding of messages in the following transfer syntax choices: Intel/Motorola byte order. Motorola orders include: (all elements or dataset only); Explicit/Implicit VR (as described in DICOM Part 5); Compression [JPEG extended baseline Huffman encoded lossy compression of pixel data (as described in DICOM Part 5), JPEG lossless Huffman encoded lossy compression of pixel data (as described in DICOM part 5); and Expansion (Imagelink proprietary lossless), JPEG extended baseline Huffman encoded lossy compression of pixel data (as described in DICOM part 5), JPEG lossless Huffman encoded lossy compression of pixel data (as described in DICOM Part 5)].

The present invention provides for syntax validation and semantic validation. Element or Syntax validation includes element VR and VM checking. Each VR type (per the one's listed above), has its own content and structural constraints which are verified (e.g. formats for date, time, person age, etc.) A minimum/maximum VM can also be checked. Syntax validation information is provided in a Syntax Dictionary. The user may create or alter the form of the Syntax dictionary.

This area determines whether or not each module is required. This area determines non-application-specific generic module requirement conditions and corresponding verification of resulting module requirement type. The conditions supported are: "Module X not required if Module Y1, Y2 . . . or Yn are present"; "Module X required if element Y value is greater than $Z_1$ and less than or equal to $Z_2$"; "Conditional or user-optional Module X required (not required) if validation requester indicates that it is required (not required)"; and "Conditional or user-optional Module X required if some element that's exclusively contained in the module is found in the corresponding IO being validated."

For (determined) required modules, this area verifies element requirement type within the module. This area also determines generic element requirement conditions and correspondingly verifies resulting element requirement types. The conditions supported are: "Element X exists"; "Element X (is single valued and it's) value is greater than $Y_1$ and less than or equal to $Y_2$"; and "Element X contains a value that matches pattern Y . . . specifically Element X has a value that matches $(Y_1|Y_2|Y_n)[3]$"

Semantics validation information is maintained in a Module Dictionary. The user creates or alters the form of the Module Dictionary. This area enables a user to define the above described types of characteristics with module semantics and data dictionary (syntax) entries. This subsystem supports the creation of the following kinds of IODs; Composite IO: one per IO type; Normalized SOP (both event/action and non-event/action): one per SOP class (and per event identifier for event SOPs or one per action identifier for action SOPs). The user creates or alters the form of a normalized SOP validation definition; Command/Status (even thought they are not IOs, their semantics are expressed in a form that is a subset of an IOD format). One per command type is provided (and for statuses there it varies on 'status category' as described in DICOM Part 7). The user may create or alter the form of a command or status validation definition.

The area validates, on a normalized SOP-basis, the permissible SETable and GETable attributes. This area validates that an SOP message operation can be performed (either incoming or outgoing) depending on peer negotiation of SCU-SCP roles. The DICOM standard requires that some Normalized SOPs not be permitted when a peer does not support negotiation of these roles.

The association subsystem implements the functionality described in DICOM part 8 for opening an association, transferring data and closing an association. This subsystem facilitates the reading of previously configured UID information, permitting Imagelink to deal with third-party vendor UIDs in a generic fashion. This subsystem also provides a means to facilitate 'canonical' negotiating of presentation context, implementation of UID Class/description, SCP-SCU roles and asynchronous windows.

This subsystem enables other entities within the API toolkit or a PACS application to encode and decode "user information" or application negotiables. Some of these negotiables are described in DICOM Parts 7 and 4. This subsystem supports the notion of both static and dynamic UIDs. A Static UID context applies to a large group of entities and whose meaning is defined in the DICOM standard or in a private or DICOM conformance claim. Dynamic UIDs apply to a specific group of entities and are generally defined at runtime by a computational facility. This subsystem translates between different vendor static UIDs. To achieve this, the user ascribes attributes to characterize individual static UIDs.

As shown in FIG. 1, the present invention runs on the following platforms and their associated operating systems, which are well known in the art: Apple Macintosh System 7, Sun Sparc 4.1x+Solaris 2.3+ and Motorola 1x7 System V (147 and 167 boards, (release supporting the 187 board) (R4) and the PC OS-9000 environment.

FILTER FRAMEWORK

The following is a description of the features of the filtering framework. The filtering framework supports two kinds of basic operation modes: an input mode and an output mode. The input mode is used when transferring images out to a remote destination. The output mode is used when receiving images from a remote destination. The filtering sequences provide the above input and output filtering chaining arrangements. Each filter stage may be bypassed. Filters in vertical alignment are applied "either/or". Filter design may results in sequences of stages being combined together into one stage for optimal performance in "frequently used" situations.

This filter framework supports the ability to build a filter chain according to a set of attributes that describes an image input format and a complimentary set that describes the desired output format. The filter builder relies on the following DICOM attributes to obtain the desired output format: Number of rows, Number of columns, Pre-padded number of rows, Pre-padded number of columns, Row number modulus, Column number modulus, Bits allocated, Bits stored, and (for each overlay) Internal/external overlay designation.

Syntax/Semantics Dictionary Text Format

This section describes the form in which the user may create or alter one of the previously mentioned syntax/ semantics dictionaries. The term "dictionary" has two meanings. In a first sense, a "dictionary" is a series of text files which can be edited with any convenient flat file editor. In a second sense, a "dictionary" is a collection of persistent entities which can be accessed by other parts of the tool kit or other PACS applications. The design of the DICOM Tool kit also calls for one or more syntax/semantics dictionary importers which will convert the series of the text file dictionaries into persistent entity dictionaries, called PDICs.

The text file dictionaries, as described above, are used as a source file from which an_obj.h and ACR-NEMA-related shared memory segments are constructed. The DICOM text file dictionaries consist of a number of separate, but related files. A PDIC is both dynamic and persistent, freeing the system from loading an entire shared-memory segment on startup. This arrangement also frees the various DICOM processes from the requirement of owning their own copies of a data dictionary, without the need for shared memory segments. This arrangement provides this functionality while enabling applications to reference dictionary objects by object name, rather than by object number. An importer process provides control over the syntactic validity of the contents of a text file before the PDIC is created, guaranteeing PDIC dictionary integrity, as well as eliminating shared memory segments. Dictionary text files are constructed using an easy-to-read series of tags and values.

In general, the structure of each text file will resemble the following:

```
NAME:      Some Item name
           ONE: Some first value
           TWO: Some second value
           THREE: Some third value
NAME:      Some second item name
           ONE: Its first value
           TWO: its second value
           THREE: Its third value
```

In this example, NAME, ONE, TWO, and THREE are called "tags". Each NAME is considered a "title tag", and all others are "subordinate tags". The text which follows each tag is referred to as its "value". Each grouping of the title tag, its value, and the set of its subordinate tags and values is a "paragraph block". A given data dictionary text file comprise of a sequence of blocks, each of which shares that same format. The collection of all such data dictionary text files will completely define the DICOM data dictionary.

Data dictionary text files are preferably constructed as a series of easily parsed text tags and values. The values of certain text tags serve as pointers into other dictionary text files. For example, a dictionary text file entry for a certain module can list names of elements which are members of the module. These element names also are names of entries in an element text file dictionary. Thus, links between data dictionary text files are established.

Each importer uses textual, symbolic links to create pointer-based links to an associated software entity. Each element entry in an element data dictionary text file, for example, is a separate entity. Likewise, each module entry a module data dictionary text file is a separate entity. Each importer uses the textual names which symbolically link entries in each text file in order to create pointers between a module and an element entity. Thus the textual information in a data dictionary text file is available to the API DICOM Toolkit as a dynamic, persistent collection of linked entities.

The importer represents a group of structured text files as a collection of linked persistent entities. All text tags should be spelled and used correctly. All values used are allowed values for the corresponding text tag. Values in one data dictionary which refer to entries in another must refer to entries which have been properly defined. For example, a module which references elements that it contains uses values for element text tags which are properly defined in the corresponding element dictionary.

A plurality of text/semantics dictionary files are provided as follows: (1) Elemsyn.dd represents both the command group element syntax defined in Annex E of DICOM Part 7 and the non-command group element syntax defined in DICOM part 6. (2) Modulsem.dd defines the module context upon which normalized IODs are based and the modules used by composite IODs, as described in Annex C of DICOM Part 3 and the annexes of DICOM Part 4. (3) Ciodsem.dd defines the composite IODs, as described in Annex A of DICOM Part 3 and the annexes of DICOM Part 4. (4) Niodsem.dd defines the normalized IODs, as described in Annex B of DICOM Part 3 and the annexes of DICOM Part 4. (5) Dimsesem.dd defines the DIMSE-C and DIMSE-N services, as described in DICOM Part 7. (6) Sstatsem.dd defines the services statuses (status types) described in DICOM Part 7 Annex C. (7) Imsem.dd represents hierarchical IM semantics. (8) Sopsem.dd defines the SOP Classes described in the annexes of DICOM Part 4. This last data dictionary text file (sopsem.d) will also specify permissible status codes for each DIMSE service within each SOP Class.

The following is an example of element syntax in elemsyn.dd:

```
NAME:    Action Type ID
         TAG: (0000,1008)
         VR: US
         VM: 1
         DESC: Values for this field are application-specific.
NAME:    Nuclear medicine Series type
         TAG: (0008,0042)
         VR: CS
         VM: 1
         PVALS: STATIC
         PVALS: DYNAMIC
         PVALS: GATED WHOLE BODY
         PVALS: STEP&SHOOT TOMO
         PALS: CONTINUOUS TOM
         PVALS: GATED TOMO
```

The name of the element VALUE can be any character string. The tag of the element value is the group and element number of the element. The VR value can be any of the two-letter codes defined in DICOM Part 5 of the DICOM standard. The VM can be any number or any range of numbers including the value "1–n", meaning "one or more, with no upper bound". The PVALS tag represents the permitted values of the element. Its value may be any value that satisfies the definition of the element's VR. It may be repeated as many times as necessary. A corresponding tag, NVALS, represents values that are not allowed.

The DESC tag provides an English language description of the element. A DEFAULT tag represents the default value of the element. If present, it should be a valid value for this element, within the bounds of its VR permitted values. The DEFAULT tag in the module dictionary text file, if present for a particular element, takes precedence over any default value specified for corresponding elements in this text file. If a default value is specified at this (syntactic) level, but not at the module (semantic) level, this default value is used.

The following is an example module semantics in modulsem.dd:

```
MODULE: Patient Identification Module
    REFERFNCE: C.2.2-1
    ATTRIBUTE: Patient's Name
        TAG: (0010,0010)
        DESC: Patient's full legal name
    ATTRIBUTE: Patient ID
        TAG: (0010,0020)
        DESC: Primary hospital identification number or code for the patient
    ATTRIBUTE: Issuer of Patient ID
        TAG: (0010,0021)
        DESC: Name of health care provider which issued the Patient ID
```

The name of each module can be any character string. The REFERENCE represents the number of the table in Annex C of DICOM Part 3. Each ATTRIBUTE tag corresponds to the name of an element in the element data dictionary. If the value of the ATTRIBUTE does not match the NAME of any entry in the element data dictionary, the importer will issue a warning but will not fail unless the Attribute's subordinate TAG value also does not match any entries in the element data dictionary. Each TAG corresponds to the TAG of an entry in an element data dictionary. If the ATTRIBUTE tag matches an element NAME, but the two TAGs don't match, the importer fails. Each DESC tag provides an English language description of the attribute.

A DEFAULT tag, subordinate to the ATTRIBUTE tag, is optional for each attribute. If present, it represents a default value of an element. It should be a valid value for the element, (within the bounds of its VR and permitted values). This DEFAULT tag, if present, takes precedence over any default value specified for corresponding elements in the element text file. A TYPE tag, subordinate to the ATTRIBUTE tag, is be present for modules which are part of Composite IODs, all submodules which are used by normalized IODs. It should not be present for other modules. If present, it represents the requirement type of the element within the module.

Whenever an element/attribute type is used, it preferably assumes one of the following values; "1", "1C", "2", "2C", "3", "X", "M", "MC" and "U", (as defined in DICOM Part 5, section 7.4; see also Annex C of Part 3, section C.1.2.3). The remaining value, "X", represents the special case of the SOP Class UID and Sop Instance UID in the SOP Common Module. Attribute requirements types for normalized SOPs are described in DICOM Part 4. If the module is used by a composite IOD, the value of the TYPE tag takes the form "TYPE: 1C". Otherwise the value of the TYPE tag takes the form "TYPE: 3/1C", meaning that it has a requirement type of 3 as a SCU, and a requirement type of 1C as a SCP. Whenever the requirement type contains "1C" or "2C", an additional COND tag is provided. The value of this tag is a tokenized encoding of the requirement type condition. The tokens used represent the supported conditions.

The following is an example of composite IO semantics, in preferred embodiment, ciodsem.dd:

```
IOD: US Multi-frame Image IOD
    REFERENCE: A.7.3
    MODULE: Patient
        REFERENCE: C.7.1.1
        USAGE: M
    MODULE: General Study
        REFERENCE: C.7.2.1
        USAGE: M
    MODULE: Patient Study
        REFERENCE: C.7.2.2
        USAGE: U
```

The name of each IOD can be any character string. The first REFERENCE tag, that is, the one that is directly subordinate to the IOD tag represents the number of the table in Annex A of DICOM Part 3. Each MODULE tag corresponds to the name of a module in the module data dictionary. If the value of the MODULE does not match the MODULE name of any entry I the module data dictionary, the importer issues a warning but will not fail unless the MODULE's subordinate REFERENCE tag value also does not match any entries in the module data dictionary.

Each REFERENCE tag occurring after the first one, that is, each one that is subordinate to a MODULE tag, corresponds to the name of the table in Annex C of DICOM Part 3 from which the this module definition is taken. If a MODULE name matches an entry in the module data dictionary, but the two REFERENCE tags do not match, the importer fails. The USAGE tag represents the type of module within a composite IOD. Its values are either "M", "C", or "U", meaning "mandatory", "conditional", or "user optional", respectively. In the case of the conditional value, the representation of the condition rule(s) in the text file is user programmable. A module requirement condition may also be defined for designated modules. The following is an example of a normalized IO semantics in niodsem.dd:

```
IOD: Film Session IOD
    REFERENCE: B.7.2-1
    MODULE: Sop Common
        REFERENCE: C.12.1
        DESC: Contains SOP Common information
    MODULE: Basic Film Session Presentation
        REFERENCE: C.13.1
        DESC: Contains Film Session presentations information
    MODULE: Basic Film Session Relationship
        REFERENCE: C.13.2
        DESC: References to related SOPs
```

The name of each IOD can be any character string. The first REFERENCE tag, that is, the one that is directly subordinate to the IOD tag, is required, and represents the number of the table in Annex B of Part 3 from which this IOD definition is taken. Each MODULE tag corresponds to the name of a module in the modsem.dd. If this value does not match the MODULE name of any entry in the module data dictionary, the importer issues a warning but will not fail unless the MODULE's subordinate REFERENCE tag value also does not match any entry in the module data dictionary. Each REFERENCE tag after the first one, that is, each one that is subordinate to a MODULE tag corresponds to the name of the table in Annex C of DICOM Part 3 from which this module definition is taken. If a MODULE name matches an entry in the module data dictionary, but the two REFERENCE tags don't match, the importer fails.

The following is an example of a DIMSE-C and DIMSE-N semantics in dimsesem.dd:

```
DIMSE: C-STORE-RQ
    REFERENCE: 9.3.1.1-1
    FIELD:  Group Length
            TAG: (0000,0000)
            DESC: The even number of bytes from the end of the value field, etc.
            USAGE: M
    FIELD:  Affected SOP Class UID
            TAG: (0000,0002)
            DESC: SOP Class UID of the SOP Instance to be stores.
            USAGE: M
```

The name of each DIMSE service can be any character string. The REFERENCE tag is optional, and represents the number of the table in DICOM Part 7 from which the DIMSE service definition is taken. Each FIELD tag is required, and corresponds to the name of an element in the element data dictionary. If the value of the FIELD does not match the NAME of any entry in the element data dictionary, the importer will issue a warning but will not fail unless the FIELD's subordinate TAG value also does not match any entry in the element data dictionary. Each TAG corresponds to the Tag of an entry in the element data dictionary. If the FIELD tag matches an element NAME, but the two TAGs don't match, the importer fails.

Each DESC tag provides an English language description of the message field. The USAGE tag value is one of "C", "C(=)", "M", "U", and "U(=)". The meaning for these symbols are defined in DICOM Part 7, section 5. The PVALS tag represents the permitted values of the message field. Its value may be any value that satisfies the definition of the field VR. It may be repeated as many times as necessary. A corresponding tag, NVALS, represents values that are not allowed.

The following is an example of service status semantics in sstsem.dd:

```
SERVICE_STATUS: Warning Attribute List Error
    REFERENCE: C.4.2
    FIELD:  Affected SOP Class UID
            TAG: (0000,0002)
            DESC: This optional field contains the SOP Class UID
                for which Attributes were not recognized.
    FIELD:  Status
            TAG: (0000,0009)
            DESC: Confirmation status of the operation.
                The value of this required
                field shall be set to 0107H.
```

The Following is an example of the IM semantics in sopsem.dd:

```
INFORMATION MODEL: Patient-Root
    PART4: ANNEX C
    NAME: Patient-Study-Series-Image hierarchical information model
    LEVEL: Patient-Level
        REQUIRED_KEY: Patient Name // must match name in elemsem.dd
        UNIQUE_KEY: Patient ID
        OPTIONAL_KEY: Referenced Patient Sequence
```

The DICOM PART 4 (or PART 10) tag is optional, and represents the Annex in Part 4 which defines this SOP Class. The NAME tag is optional, and represents the name of this information model. The LEVEL tag is used for each level in the hierarchy. Within each level, three configurables are permitted, (see DICOM Part 4 Annex C). Required keys are expressed with REQUIRED_KEY, unique keys with UNIQUE_KEY and optional keys with OPTIONAL_KEY. Attributes within a level reside in a file elemsyn.dd. Each attribute may appear in at most in one level of hierarchy.

The following is an example of the SOP semantics in sopsem.dd:

---

```
SOP CLASS: BASIC_STUDY_CONTENT_NOTIFICATION
    PART 4: ANEX D
    NAME: Basic Study Content Notification SOP Class
    DIMSE: C-STORE
        IOD: Basic Study Descriptor IOD
        STATUS:
            Success:
                MEANING: Complete Study Content exists on system supporting SCP
                CODE: 0000
                ...
            Failure:
                MEANING: Failed Operation
                CODE: Cxxx
```

---

The DICOM PART 4 tag represents the Annex in DICOM Part 4 which defines this SOP Class. The name following the SOP CLASS tag is used for each SOP Class. Its value is a legal UID name as prescribed by Static UID Semantics. The NAME tag represents the name of this SOP Class. There should be one DIMSE tag, with corresponding subordinate tags, for each of the DIMSE services offered by this SOP Class. The value of the DIMSE tag is a character string and is the name of one of the entries in the dimsesem.dd data dictionary. If the value of this DIMSE tag is not found there, the importer fails.

For each composite DIMSE tag, a subordinate IOD or IM tag is provided, which names the composite IOD or IM which is used by the SOP Class for the service. The name of the IOD or IM is an entry in the corresponding text file. If the value of this tag is not found in the corresponding text file, the importer fails. For each normalized DIMSE tag, there is a subordinate tag, which may be either IOD, IM, or some variation which represents the IOD, or IM, or module, or submodule, or collection of elements upon which the DIMSE service acts.

In addition, for normalized DIMS TAGs which are N-Event or N-ACTION, two additional structures are permissible, subordinate to the DIMS tag, to encapsulate the notion that N-EVENT and N-ACTION SOPs have "ID" dependent semantics. Here is an examples of the N-EVENT form; the N-ACTION form is similar;

---

```
EVENT TYPE ID: 1
    NAME: "printer out of paper"
    MODULE: submodule-1-tbd
EVENT TYPE ID: 2
    NAME: "printer is off or unavailable"
    MODULE: submodule-2-tbd
```

---

Multiple EVENT TYPE or ACTION TYPE modules may appear in sequence, until all of the corresponding Ids are represented. For each DIMSE tag, whether composite or normalized, there is a subordinate tag called STATUS. Subordinate to the STATUS tag are one or more names of service status, as defined in a file or dictionary called statsem.dd dictionary. If any of these status tags names is present, then it is followed by a list of one or more status values which are recognized by this SOP for this status type. For normalized SOPs that support N-SET or N-GET, there are optional tags that can be used to express the permissible gettable/settable attributes.

---

```
DIMSE: N-SET
    SETTABLE_ATTRIBUTES...
DIMSE: N-GET
    GETTABLE_ATTRIBUTES:
```

---

The following is the displayable text format for element objects (i.e. DICOM attributes) (bold indicates non-terminal a grammar symbol while normal is a literal symbol):

---

```
<Dicom-text-dump>    ::=<element-format>...
<element-format>     ::=<group-number><comma><element-
    number><whitespaces><vr-type><whitespaces><length-hex>
    <space><length-dec><whitespaces>{"NON-STD"|
    <shadow-manufacturor>} {"EMPTY"|"SEQUENCE"|
    "ITEM"|"END ITEM"|"END SEQUENCE"|
    <string-value>|<integer-value>|<unsigned-int-values>|
    <long-values>|<unsigned-long-values>|<hex-words>|
    <hex-bytes>|<float-values>|<unfinished-data>|tbd}
<group-number>       ::=0x0000 through 0xFFFF
<element-number>     ::=0x0000 through 0xFFFF
<vr-type>    ::=<single-quote> {"AE"|"AS"|"AT"|"CS"|"DA"|
"DS"|
    "DT"|"FL"|"FD"|"IS"|"LO"|"LT"|"OB"|"OW"|"PN"|
"SH"|
    "SL"|"SQ"|"SS"|"ST"|"TM"|"UI"|"UL"|"US"|
    <unknown-vr-type>} <single-quote>
<string-value>       ::=<double-quote>chars
<double-quote>       ::="""
lenght-dec> ::=<LT-sign><uppercase-characters>
```

```
    <GT-sign>
    <float-value>::=<sign><digits><decimal-point>
       <digits>[<sign>"e"<digits>]
    <whitespace>           ::={<space>|<cr>|<tab>}
    <whitespaces>          ::=...
    <unfinished-data>      ::=...
    <shadow-manufacturor>  ::=<LT-sign><chars><GT-sign>
    <unknown-vr-type>      ::="??"
    <length-hex>           ::=0x0000 through 0xFFFF for 16-bit lengths,
                             or 0x00000000 through 0xFFFFFFFF for 32-bit lengths
    <single-quote>         ::='\''
    <double-quote>         ::='"'
    <backslash>            :='\'
    <chars>                ::=7-bit printable ascii chars, \0x00 through \0xFF for non-
                             printable characters
    <integer-value>        ::=-32768 through 32767
    <unsigned-int-value>   ::=0 through 65535
    <long-value>           ::=-2147483648 through 2147483647
    <unsigned-long-value>  ::=0 through 4294967295
    <hex-word>             ::=0000 through FFFF
    <hex-byte>             ::=0x00 through 0xFF
    <GT-sign>              ::='>'//when not inside single or double-quotes
    <LT-sign>              ::='>'//when not inside single or double-quotes
    <comma>                ::=','
    <space>                ::="
```

In order to create a particular kind of database, a database definition language is used. The language is very simple as the underlying database should be a HIM and the attributes permitted DICOM-VR type ones. The following is the grammar for the toolkit database definition language (bold indicates non-terminal grammar symbol while normal is a literal symbol):

```
<database-definition>  ::=<im-definition>...
<im-definition>        ::=<im-model-definition><attribute-name-list>
<im-model-definition>  ::="INFORMATION_MODEL"<whitespaces>":"
    <whitespaces><him-type>
<him-type>  ::=["PATIENT_ROOT"|"STUDY_ROOT"|"STUDY_ONLY"|
    "PRINT_SESSION_ROOT"|"RINTSESSION_ONLY"]
<attribute-name-list> ::=<attribute_name>...
<attribute-name> ::={<group-number><element-number>|
    <element-description>}["index"|]
```

Semantics:

1. Referenced elements should be defined in the Syntax Dictionary.
2. Elements should not be included more than once.
3. Element representation is driven by the VR for that element in the Syntax Dictionary.
4. The set of types of IOs insertable within any two information models within a database definition should be mutually exclusive i.e. a given information object should only exist within one hierarchy for a given database.
5. No relationship between any two information models should be made via this definition. Artificial relationships can be introduced at run-time through the use of user folders.
6. The above im-type list is partial. Other im-types can be defined as long as they follow the general behavior of an IM outlined in DICOM Part 4 Annex C of the standard. Basically this means that:
   (a). The IM should be hierarchical. The database consists of levels. A parent level has a 1-m multiplicity relationship with a child level. There is a root-level that has no parent. A database attribute only resides in one level.
   (b). Consist only of DICOM (or DICOM VR-compatible) attributes. (c). Each level must have a unique key and one or more required keys. A level may contain optional keys. (d). For IM's that match the DICOM standard, the user should only deviate from the standard with regard to optional key support.

7. The optional literal "index" is used to suggest that the database create and maintain an index on the associated attribute. The result of "processing" this database definition language, is a database manipulation API. This API is the sole means by which an application accesses information in the database. MINIMALLY, this API provides a means to: create/destroy a database, open/close connections to an existing database, create/delete new database-level entities, get/set attributes from any database-level entity, query to find certain database-level entities, or navigate through a given level of database-level entities.

Static UID Semantics

The following is a description of the static UID semantics format:

```
<whitecap>              ::={<tab>|"|<line-connector>}
<whitecaps>             ::=<whitespace>...
<line-connector>        ::=\'
<digit>                 ::=|0-9|
<uid-char>              ::=<digit>|'.'
<short-string-constant>   ::= 0–63 Alpha-Numeric characters
<long-string-constant>    ::= 0–127 Alpha-Numeric characters
<ae-string-constant>      ::= 0–16 Alpha-Numeric characters
<application-entity-title> ::= <ae-string-constant>
<comment>                 ::= <long-string-constant>
<company-prefix>          ::= "1.2.840.113590."
<uid>                     ::= 0–64 of <uid-char>
<node-unique-uid>           ::= <uid>
<base uid> ::="BASE_UID"<whitespaces>":"<whitespaces>
      <node-unique-uid>
<static-uid-paragraph>    ::= "STATIC_UID""{"{<whitespaces>
    <uid><whitespaces><uid-description>{<whitespaces>
    <comment>}}..."{"
<uid-description>    ::={   <abstract-syntax-descr>|
                            <application-context-descr>|
                            <meta-sop-class-descr>|
                            <transfer-syntax-descr>|
                            <sop-clas-descr>
                        }
<abstract-syntax-descr>   ::="ABSTRACT_SYNTAX"<whitespaces>
    <vendor-defn><whitespaces><presenttion-style-defn>
    {"*"|{<meta-sop-class-uid>}...}
<application-context-descr>  ::="APPLICATION_CONTEXT"<whitespaces>
    <vendor-defn><whitespaces>{<sop-class-name>}<sop-class-uid>...
<sop-class-descr>::="SOP_CLASS"<whitespaces>
    <vendor-defn><whitespaces>{<sop-class-name>|}
    "AN-CMD="<sop-defn>
<transfer-syntax-descr>   :="TRANSFER_SYNTAX"<whitespaces>
    <vendor-defn><whitespaces>{<byte-order>|}
    {compression|}{vr|}
<presentation-style defn>   ::="PRESENTATION_STYLE="[
    "GE_INTERIM_PROFILE_92_2"|"GE_INTERIM_PROFILE_92_3"|
    "RSNA_92"|"IMAGELINK_2"|"DICOM_3"]
    <whitespaces>
<vendor-defn>::="VENDOR="["*"|"GE"|"KODAK"|"MERGE"|
    "OTSUKA"|"PHILLIPS"|"PICKER"|
    "RSNA_92_2_CONNECTATHON"|
    "RSNA_93_CONNECTATHON"|"PHILLIPS"|
    "SIEMENS"|"VORTECH"]
<sop-defn>::={"*"|<store-def>|"C-ECHO"|find-defn>|
    <move-defn>|<print-defn>|<his-ris-defn>}
<sop-class-name>::="SOP_NAME="<short-string-constant><whitespaces>
<store-defn>::="C-SEND"{<dataset-type>|}{<modality-type>|}
<dataset-type>::="DATASET_TYPE="["*"|"IMAGE"|"GRAPHICS"|
    "CURVE"]
    <whitespaces>
<modality-type>::="MODALITY_TYPE="["*"|"CT"|"DR"|"MR"|"NM"
    |"SC"|"US"]
    <whitespaces>
<find-defn>::="C-FIND"{<im-type>|}
<im-type>::="IM-TYPE="{"HIERARCHICAL"<HIM-TYPE>
    |"RELATIONAL"|"OO"}
    <whitespaces>
<him-type>::="HIM-TYPE="["PATIENT_ROOT"|"STUDY_ROOT"|
    "STUDY-ONLY"|"PRINT_SESION_ROOT"|
    "PRINT_SESSION_ONLY"]
    <whitespaces>
<move-defn>::="C-MOVE"[<im-type>}<wildcarded-moves>
<wildcarded-moves>::=["WILDCARDED_MOVES"|
    "STANDARD_MOVES"]
<print-defn>::=<print-sop-class-type>
<print-sop-class-type>::=["FILM_SESION"|"FILM_BOX"|
    "BW_IMAGE_BOX"|"COLOR_IMAGE_BOX"|
    "BW_REFED_IMAGE_BOX"|"COLOR_REFED_IMAGE_BOX"|
    "PRINTER"|"PRINT_JOB"|"VOI_LUT"|"OVERLAY_BOX"]
<his-ris-defn>::=tbd
<his-ris-sop-class-type>::=['DET_PATIENT_MAN"|
    "PATIENT_NOTIFY"|"DET_VISIT_MAN"|"VISIT_NOTIFY"|
    "DET_STUDY_MAN"|"STUDY_NOTIFY"|"STUDY_COMP_MAN"|
    "DET_RESULTS_MAN"|RESULTS_NOTIFY"|
    "DET_INTERPRET_MAN"]
<byte-order>::="BYTE_ORDER="["INTEL"|"MOTOROLA"]
    <whitespaces>
<compression>::="COMPRESSION="["NONE"|"VORTECH_LOSSLESS"|
    "JPEG_EXT_BASE_LOSSY_HUFFMAN"|
```

```
"JPEG_LOSSLESS_HUFFMAN"]
    <whitespaces>
<VR>::="VR="["EXPLICIT"|"IMPLICIT"]
    <whitespaces>
```

What is claimed is:

1. A method for negotiating compatible functionality between two applications running on a picture archival and communication system (PACS) computer system comprising the steps of:
   (a) converting a set of medical images and data to digital form;
   (b) transmitting the images and data to a PACS and storing the digital form of the images and data on a PACS;
   (c) receiving a request from a first application, A having a first unique identifier (UID);
   (d) reading the UID from the request from application A;
   (e) determining functional characteristics for application A by examining the UID for A; and
   (f) negotiating functional compatibility between the service requested by A as determined in said determining step and the services available within the PACS.

2. The method of claim 1 further comprising the steps of:
   (g) creating a configuration file of UIDs and correlative functional data;
   (h) transmitting the configuration file and correlative functional data to a PACS; and
   (I) reconfiguring a PACS based on the configuration file and correlative data.

3. The method of claim 1 further comprising the steps of:
   (g) rejecting the request from a first application, A when functional compatibility is not negotiated.

4. The method of claim 1 further comprising the steps of:
   (g) examining a second UID for an application in the PACS; and
   (h) negotiating functional compatibility between the first UID and the second UID.

5. The method of claim 1 wherein the step of negotiating functional compatibility comprises the steps of:
   (a) determining a conformance claim for the first UID;
   (b) determining whether the UID is a DICOM (Digital Imaging Communication) UID or a private UID;
   (c) interpreting the functional requirements of the conformance claim;
   (d) accessing the functional characteristics of applications available on the PACS to determine if the functional requirements of the conformance claim can be met by an application on the PACS.

6. The method of claim 5 further comprising the step of:
   (e) accessing a private dictionary to determine the functional characteristics for a private UID; and
   (f) accessing a DICOM dictionary to determine the functional characteristics for DICOM UID.

7. The method of claim 1 further comprising the steps of:
   (g) determining a service type request comprising store, query, retrieve, patient management, busy management, steady management and results management;
   (h) accessing an abstract syntax to determine functional compatibility.

8. The method of claim 1 further comprising the steps of:
   (g) providing an association control system to assign attributes to UIDs;
   (h) providing an information object subsystem to provide services for composite and normalized information objects;
   (I) providing pixed data processing comprising byte order, data packing, overlay conversion, compression/expansion, non-square pixels, multi-planar/interleave pixel data conversion, and multi-frame pixel/overlay data separating/combining; and
   (j) providing a message management system to define requests comprising transactions and relate the transactions to open associations.

9. The method of claim 1 further comprising the step of:
   (g) providing a presentation subsystem;
   (h) performing generic validation in the presentation subsystem;
   (I) providing syntax validation dictionaries and semantic validation dictionaries for a request message element elements; and (j) providing syntax validation and semantic validation for a request message element elements.

10. The method of claim 8 further comprising the steps of:
    (k) providing a command group element syntax;
    (l) providing a module context definition;
    (m) providing a composite IOD (Information Object Definition) definition;
    (n) providing a normalized IO definition;
    (o) providing status definitions; and
    (p) providing hierarchical information model semantics.

* * * * *